RECORDING HEAD HOLDER

Filed Dec. 16, 1960

INVENTOR.
James P. Casey
BY
Harness, Dickey & Pierce

United States Patent Office
3,218,648
Patented Nov. 16, 1965

3,218,648
RECORDING HEAD HOLDER

James P. Casey, Northville, Mich., assignor to Ex-Cell-O Corporation, Detroit, Mich., a corporation of Michigan Filed Dec. 16, 1960, Ser. No. 76,192
3 Claims. (Cl. 346—74)

This invention relates generally to magnetic recording apparatus and more particularly to an improved holder for the magnetic transducers of magnetic recording apparatus.

Magnetic drums are often used for the recording and semi-permanent storage of intelligence in, for example, digital computers. Such magnetic drums operate at speeds of, for example, 100,000 r.p.m. and have a capacity of, for example, five million separate bits of intelligence which are magnetically stored in a magnetic coating on the radially outer periphery of the drum.

Intelligence is transferred to the magnetic coating on the drum by one or more magnetic transducers that are supported in radially spaced relation to the outer peripheral surface of the drum by a housing that envelopes the drum. Because the spacing between the magnetic transducers and the magnetic coating on the outer peripheral surface of the drum must be positively maintained, extreme care is exercised in the manufacture of the drum to minimize runout thereof at the aforementioned high operating speeds.

However, it has been a problem in such recording apparatus heretofore known and used to support the magnetic transducers used to transfer intelligence to the magnetic coating on the drum in such a manner that clamping of the tranducers, after gauging of the spacing between the face of the magnetic transducer and the magnetic coating on the peripheral surface of the recording drum, in no way alters this spacing. Such clamping must be effected without advancing or retracting the transducer radially of the drum or cocking the magnetic transducer which would deflect the inner end face thereof out of a tangential plane with respect to the recording drum.

The present invention is directed to an improved recording head holder for supporting and clamping the magnetic transducers of magnetic recording apparatus at a desired spacing from the recording surface of the magnetic drum. Clamping is effected without causing movement of the transducer relative to the recording surface or cocking of the transducer. Access is provided to the holder radially of the drum thereby facilitating adjustment and clamping of the transducer.

Accordingly, one object of the present invention is an improved magnetic recording apparatus.

Another object is an improved holder for a magnetic transducer of magnetic recording apparatus.

Another object is a holder for clamping a magnetic transducer relative to the recording surface of a magnetic recording drum without inducing relative movement therebetween.

Another object is a recording head holder for a magnetic transducer that is accessible radially of the magnetic storage drum.

Another object is a recording head holder that locks the magnetic transducer without effecting cocking thereof.

Another object is a recording head holder that is self-aligning on a cylindrical housing.

Other objects and advantages of the present invention will become apparent from the following specification, claims and drawings wherein:

Figure 1:
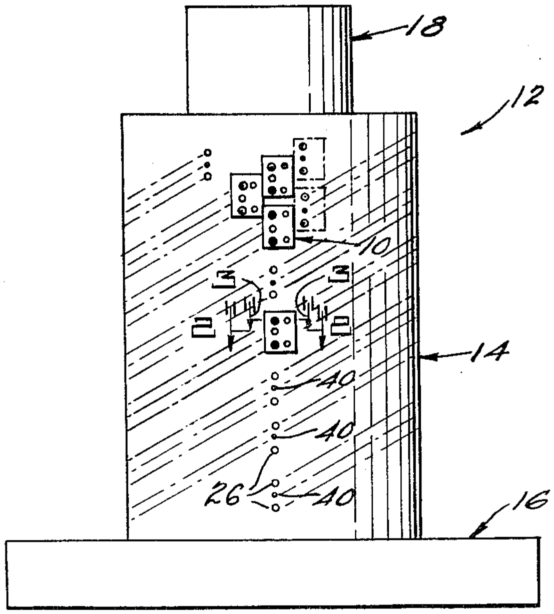
FIG. 1 is a side elevational view of a magnetic recording apparatus including a plurality of recording head holders.

A recording head holder 10, in accordance with an exemplary constructed embodiment of the present invention, is shown in operative association with a drum type magnetic recording apparatus 12. The magnetic recording apparatus 12 comprises a cylindrical housing 14 for the support of a plurality of recording head holders 10, a base member 16, and a drive motor 18. A drum 20 (FIGS. 2 and 3) having a magnetic coating 22 of, for example, a high density magnetic oxide or electroplated magnetic alloy coating is rotatable within the housing 14 for the acceptance of bits of intelligence which are transmitted thereto by one or more cylindrical magnetic transducers or recording heads 24 that are supported by the recording head holders 10. The recording heads 24 extend through suitable apertures 26 in the housing 14 into closely spaced relation to the surface 22 of the drum 20. Because the recording head holders 10 are similar in construction, only one such holder will be described hereinafter.

Figures 3, 4:
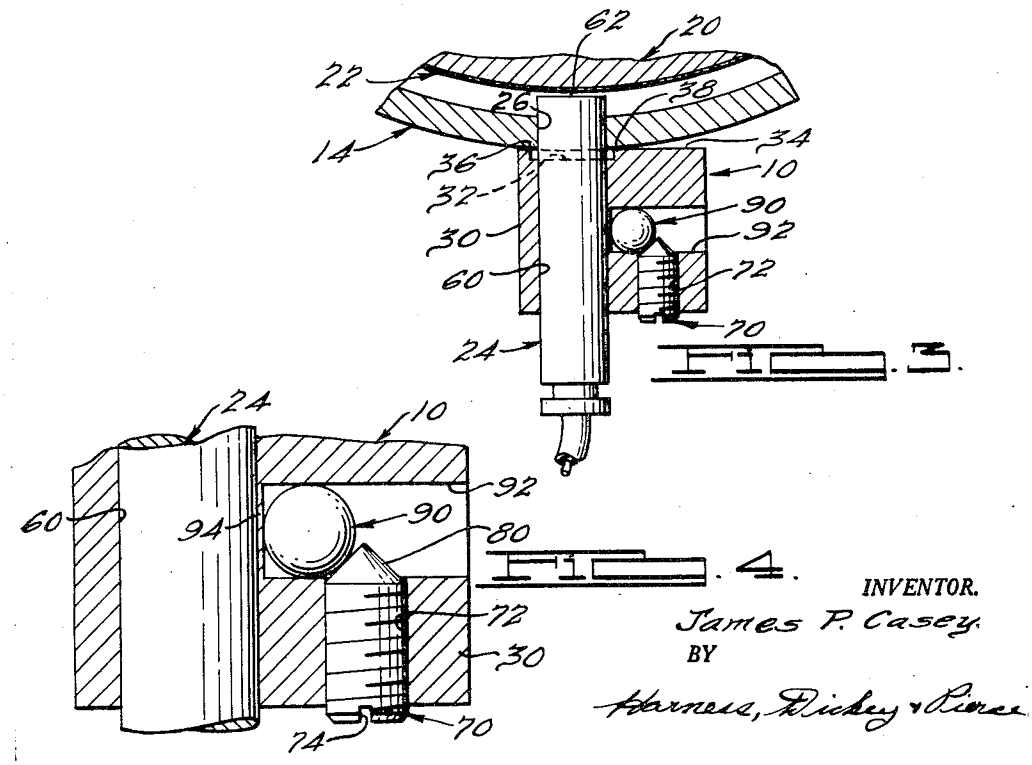
FIG. 3 is a cross sectional view taken substantially along the line 3—3 of FIGURE 1.
FIG. 4 is an enlarged cross sectional view of a portion of FIG. 3.

Referring now to FIG. 3, each recording head holder 10 comprises a generally rectangular supporting block made from, for example, aluminum, having an elongated slot or recess 32 in a radially inner face 34 thereof that defines a pair of spaced parallel edges 36 and 38 that positively locate or index the holder 10 in alignment with the central axis of the housing 14.

Figure 2:
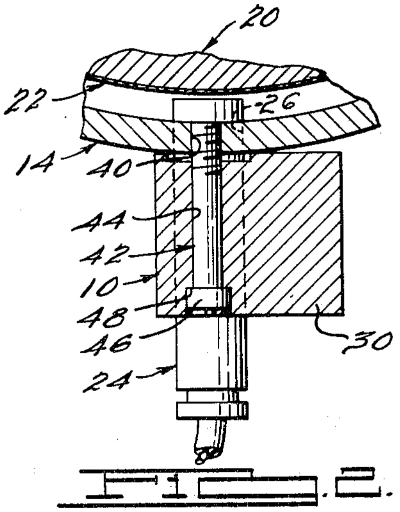
FIG. 2 is a cross sectional view taken substantially along the line 2—2 of FIGURE 1.

As best seen in FIG. 2, the housing 14 is provided with a threaded aperture 40, at each recording head station, for the acceptance of a complementary holding screw 42 that extends through a transverse bore 44 in the recording head holder. A head portion 46 of the screw 42 is seated in a complementary counterbore 48 in the holder 10 so that upon advancement of the screw 42, the recording head holder 10 is biased against the cylindrical housing 14. Because the spaced parallel edges 36 and 38 on the face 34 of the holder 10 engage the cylindrical housing 14 in spaced line engagement, the holder 10 is positively aligned with the central axis of the housing 14 in an index position.

As best seen in FIGS. 3 and 4, the recording head holder 10 has a bore 60 therein extending normally to the inner face 34 and thereof radially of the drum 20 for the acceptance of the cylindrical recording head 24. The recording head 24 is slidable axially of the bore 60 to facilitate positioning of an inner end face 62 thereof at a desired spacing from the magnetic surface 22 of the drum 20, as by a gauge (not shown).

In accordance with one feature of the present invention, the magnetic recording head 24 is positively lockable withing the bore 60 with the end face 62 thereof at a desired radial spacing with respect to the peripheral surface 22 of the magnetic drum 20 upon advancement of a locking screw 70.

The locking screw 70 is accepted in a complementary threaded bore 72 that extends parallel to the bore 60 therefore normally of the face 34 on the holder 10.

The screw 70 has a generally conical inner end face 80 for engagement with a laterally movable ball 90 made from, for example stainless steel. The ball 90 is supported within and movable axially of a bore 92 that extends transversely of the bores 60 and 72 in the recording head holder 10, the central axis of the bore 92 intersecting the central axis of the bore 60 at the longitudinal midpoint thereof. The ball 90 is movable under the bias of the screw 70 due to camming engagement between the conical surface 80 of the screw 70 and the outer periphery of the ball 90. The screw 70 engages the outer periphery of the ball 90 at a point included in a radius of the ball 90 extending substantially 45 degrees to the central axis of the bore 92.

The ball 90 is biased into what amounts to spot engagement with a relatively thin and deformable end wall 94 of the bore 92, deformation of the end wall 94 axially of the bore 92 and radially against the recording head 24 effecting locking of the recording head 24 within the bore 60. In this manner, the transducer 24 is positively locked within its complementary bore 60 by a radial contraction of the bore 60 which does not have an axial or rotational vector with respect to the recording head 24 tending to effect axial movement or cocking thereof.

It is to be understood that the specific construction of the improved recording head holder herein disclosed and described is presented for the purpose of explanation and illustration and is not intended to indicate limits of the invention, the scope of which is defined by the following claims.

What is claimed is:

1. A recording head holder for supporting the magnetic recording head of magnetic recording apparatus including a magnetic recording surface, said recording head holder having a first aperture with a cross section complementary to the cross section of the recording head so as to support the recording head for movement toward and away from the recording surface, said holder having a recess extending to close proximate relation to but not communicating with said first aperture, means within said recess advanceable normally of the direction of movement of the recording head for elastically deforming the aperture in the holder thereby to lock the recording head at a desired spacing from the recording surface, and means for effecting movement of said deforming means.

2. In a magnetic recording apparatus including a magnetic recording surface and a cylindrical magnetic recording head, a recording head holder having a first bore for the acceptance of the recording head, and means for supporting said holder so that the recording head is movable toward and away from the recording surface, said holder having a second bore extending normally with respect to said first bore into close proximate relation to but not communicating with said first bore, a ball within said second bore advanceable axially thereof and normally of the direction of movement of the recording head for elastically deforming a wall portion of said first bore thereby to lock the recording head at a desired spacing from the recording surface, and means for effecting movement of said ball axially of said second bore.

3. In a recording head holder having a first bore for the acceptance of a cylindrical recording head, means for locking the recording head against axial movement of said first bore comprising a second bore extending into close proximate relation to but not communicating with said first bore, the axes of said first and second bores intersecting at a right angle so that an end wall of said second bore defines a relatively thin side wall of said first bore, a ball within said second bore, and means for effecting movement of said ball axially of said second bore against the end wall thereof comprising a screw threadably engaged in a third bore extending normally to said second bore, said screw having an end portion engageable with said ball in camming relationship whereby rotation of said screw effects advancement thereof against said ball thereby to move said ball axially of said second bore against the end of wall thereof and elastically deform the side wall of said first bore to lock the recording head at a desired position.

References Cited by the Examiner

UNITED STATES PATENTS

| | | | |
|---|---|---|---|
| 1,244,848 | 10/1917 | Kadke. | |
| 1,391,097 | 9/1921 | Cowles | 340—174.1 |
| 2,713,386 | 7/1955 | Holtz | 340—174.1 |
| 2,827,355 | 3/1958 | Lubkin et al. | 346—74 |
| 2,859,084 | 11/1958 | Raddin | 179—100.2 |
| 2,862,064 | 11/1958 | Wallace et al. | 179—100.2 |
| 2,864,892 | 12/1958 | Perkins | 346—74 |
| 2,905,933 | 9/1959 | Canepa | 340—174.1 |
| 2,965,886 | 12/1960 | Mitchell | 340—174.1 |

FOREIGN PATENTS

| | | |
|---|---|---|
| 801,982 | 9/1958 | Great Britain. |

IRVING L. SRAGOW, *Primary Examiner.*

NEWTON N. LOVEWELL, *Examiner.*